US006924947B2

(12) United States Patent
Saori (10) Patent No.: US 6,924,947 B2
(45) Date of Patent: Aug. 2, 2005

(54) WIDE-ANGLE LENS SYSTEM

(75) Inventor: Masakazu Saori, Saitama (JP)

(73) Assignee: PENTAX Corporation, Tokyo (JP)

( * ) Notice: Subject to any disclaimer, the term of this patent is extended or adjusted under 35 U.S.C. 154(b) by 5 days.

(21) Appl. No.: 10/762,378

(22) Filed: Jan. 23, 2004

(65) Prior Publication Data

US 2004/0150894 A1 Aug. 5, 2004

(30) Foreign Application Priority Data

Jan. 23, 2003 (JP) ........................................ 2003-014896

(51) Int. Cl.[7] .......................... G02B 15/14; G02B 13/04
(52) U.S. Cl. ...................................... 359/749; 359/680
(58) Field of Search ........................ 359/745, 749–751, 359/755, 676, 680, 682, 690

(56) References Cited

U.S. PATENT DOCUMENTS

| 6,181,483 | B1 | 1/2001 | Takatsuki |
| 2003/0218799 | A1 | 11/2003 | Sensui et al. |

FOREIGN PATENT DOCUMENTS

| JP | 7-181376 | 7/1995 |
| JP | 10-054934 | 2/1998 |
| JP | 10-142495 | 5/1998 |
| JP | 2000-039553 | 2/2000 |
| JP | 2000-131606 | 5/2000 |

Primary Examiner—Scott J. Sugarman
Assistant Examiner—Alicia M. Harrington
(74) Attorney, Agent, or Firm—Greenblum & Bernstein, P.L.C.

(57) ABSTRACT

A wide-angle lens system includes a negative first lens group, and a positive second lens group, in this order from the object. The groups are positioned so that the distance between the negative first lens group and the positive second lens group is set as the maximum distance in the wide-angle lens system. The wide-angle lens system satisfies the following conditions:

$$2.0 < fB/f < 2.5 \quad (1)$$

$$4.5 < f1/f < 6.2 \quad (2)$$

$$1.8 < f2/f < 2.0 \quad (3)$$

$$1.0 < d/f < 1.5 \quad (4)$$

wherein fB: the back focal distance of the wide-angle lens system; f: the entire focal length of the wide-angle lens; f1: the focal length of the negative first lens group; f2: the focal length of the positive second lens group; and d: the axial distance between the negative first lens group and the positive second lens group.

7 Claims, 8 Drawing Sheets

WIDE-ANGLE LENS SYSTEM

BACKGROUND OF THE INVENTION

1. Field of the Invention

The present invention relates to a wide-angle lens system having a long back focal distance suitable for an electronic still camera.

2. Description of the Prior Art

In an electronic still camera which utilizes a solid-state image sensor such as a CCD, miniaturization and higher definition of imaging devices have progressed, and accordingly, a wide-angle lens system having a short focal length has become increasingly in demand. In addition, in such an electronic still camera, in order to provide optical elements, such as a low-pass filter, an infra-red filter, and a beam splitter, etc., between the photographing lens system and the imaging device, a long back focal distance is required. However, in a wide-angle lens system, it is difficult to obtain both a long back focal distance and a desirable optical performance.

SUMMARY OF THE INVENTION

The present invention provides a wide-angle lens system having an f-number of approximately 2.8, having good optical performance at a half angle-of-view of 30° or more at the short focal length extremity, and having a back focal distance sufficiently longer than the focal length of the entire lens system.

According to an aspect of the present invention, there is provided a wide-angle lens system including a first lens group having a negative refractive power (hereinafter, a negative first lens group), and a second lens group having a positive refractive power (hereinafter, a positive second lens group), in this order from the object. The negative first lens group and the positive second lens group are positioned so that the distance between the negative first lens group and the positive second lens group is set as the maximum distance in the wide-angle lens system. The wide-angle lens system satisfies the following conditions:

$$2.0 < fB/f < 2.5 \quad (1)$$

$$4.5 < |f_1/f| < 6.2 \quad (2)$$

$$1.8 < f_2/f < 2.0 \quad (3)$$

$$1.0 < d/f < 1.5 \quad (4)$$

wherein fB designates the back focal distance of the wide-angle lens system;

f designates the focal length of the entire wide-angle lens system;

$f_1$ designates the focal length of the negative first lens group;

$f_2$ designates the focal length of the positive second lens group; and d designates the axial distance between the negative first lens group and the positive second lens group.

Three negative lens elements are preferably provided in the negative first lens group, and the three lens elements satisfy the following conditions:

$$|\phi_{n-3}| < |\phi_{n-1}| < |\phi_{n-2}| \quad (5)$$

$$\nu_{n-3} < \nu_{n-1} < \nu_{n-2} \quad (6)$$

$$31.0 < (\nu_{n-1} + \nu_{n-3})/2 < 38.0 \quad (7)$$

wherein $\phi_{n-1}$, $\phi_{n-2}$, and $\phi_{n-3}$ designate optical powers (hereinafter, power) of the three negative lens elements in this order from the object; and $\nu_{n-1}$, $\nu_{n-2}$, and $\nu_{n-3}$ designate Abbe numbers of the three negative lens elements in this order from the object.

The wide-angle lens system can satisfy the following conditions:

$$0.7 < f1/r12 < 1.2 \quad (8)$$

$$0.7 < f1/r21 < 1.2 \quad (9)$$

$$|(r12-r21)/(r12+r21)| < 0.1 \quad (10)$$

wherein r12 designates the radius of curvature of the most image-side surface of the negative first lens group; and r21 designates the radius of curvature of the most object-side surface of the positive second lens group.

The negative first lens group can include a negative meniscus lens element having the convex surface facing toward the object, a biconvex positive lens element, a negative meniscus lens element having the convex surface facing toward the object, a biconcave negative lens element, and a biconvex positive lens element, in this order from the object.

The positive second lens group can include, for example, cemented lens elements having a negative lens element and a positive lens element, and a positive lens element, in this order from the object.

In the wide-angle lens system, a diaphragm is preferably provided behind the positive second group for the purpose of simplifying the mechanical structure of the wide-angle lens system. In this case, the diaphragm can be provided in the camera body.

On the other hand, for the purpose of securing both a higher optical performance and sufficient peripheral illumination, the diaphragm is preferably provided between the negative first lens group and the positive second lens group.

The present disclosure relates to subject matter contained in Japanese Patent Application No. 2003-14896 (filed on Jan. 23, 2003) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

As shown in the first through fourth embodiments shown in FIGS. 1, 3, 5 and 7, respectively, the wide-angle lens system includes a negative first lens group 10, and a positive second lens group 20, in this order from the object. The negative first lens group 10 and the positive second lens group 20 are positioned so that the distance between the negative first lens group 10 and the positive second lens group 20 is set as the maximum distance in the wide-angle lens system.

In the first through third embodiments (FIGS. 1, 3 and 5), a diaphragm S is provided behind the positive second lens group 20 (i.e., being behind all the lens groups).

In the fourth embodiment (FIG. 7), the diaphragm S is provided between the negative first lens group 10 and the positive second lens group 20.

In each of the first through fourth embodiments, a filter group (or, an optical-path splitting device) 30 is provided behind the positive second lens group 20.

Condition (1) relates to the back focal distance and the focal length of the entire wide-angle lens system.

If fB/f exceeds the lower limit of condition (1), it becomes difficult to insert optical elements such as a low-pass filter(s) or a beam splitter behind the positive second lens group 20.

If fB/f exceeds the upper limit of condition (1), the back focal distance becomes too long, and the diameter of the diaphragm S and that of the entire lens groups (especially, the diameter of the positive second lens group 20) become larger. Consequently, miniaturization of the wide-angle lens system becomes difficult. In particular, if fB/f exceeds the upper limit of condition (1) under the condition that the diaphragm S is provided behind the positive second lens group 20, the drawbacks (i.e., the too long back focal distance, and the larger diameters of the diaphragm S and the entire lens groups) mentioned above may occur excessively, because the back focal distance and the diameter of the diaphragm S are in a proportional relationship.

Conditions (2) and (3) specify the powers of the negative first lens group 10, the positive second lens group 20 and the entire lens system.

If $|f_1/f|$ exceeds the lower limit of condition (2), the negative power of the negative first lens group 10 becomes too strong. As a result, it is advantageous to secure a longer back focal distance with respect to the focal length of the entire wide-angle lens system; however, aberrations occurred in the negative first lens group 10 cannot be corrected.

If $|f_1/f|$ exceeds the upper limit of condition (2), a sufficient back focal distance cannot be secured.

If $f_2/f$ exceeds the lower limit of condition (3), the positive power of the positive second lens group 20 becomes too strong. As a result, aberrations occurred in the positive second lens group 20 cannot be corrected, and it becomes difficult to secure a sufficient back focal distance.

If $f_2/f$ exceeds the upper limit of condition (3), the overall length of the wide-angle lens system becomes longer, so that miniaturization of the wide-angle lens system cannot be achieved.

Condition (4) specifies the distance between the negative first lens group 10 and the positive second lens group 20.

If d/f exceeds the lower limit of condition (4), a sufficient back focal distance cannot be secured, and aberrations cannot be adequately corrected.

If d/f exceeds the upper limit of condition (4), the overall length of the wide-angle lens system becomes longer, and miniaturization of the wide-angle lens system becomes difficult.

In addition, in the case where three negative lens elements are provided in the negative first lens group 10, occurrence of lateral chromatic aberrations can be reduced by determining the most appropriate Abbe numbers for each of the three negative lens elements.

Furthermore, in order to reduce occurrence of higher order aberrations, the radius of curvature of the most image-side surface of the negative first lens group 10, and the radius of curvature of the most object-side surface of the positive second lens group 20, i.e., the radius of curvatures of the directly facing lens surfaces of these lens groups, are adequately determined, which will be explained in detail.

Conditions (5), (6) and (7) relates to the three negative lens elements in the case where these negative lens elements are provided in the negative first lens group 10.

Out of the three negative lens elements, if the power of the most object-side negative lens element becomes stronger, the negative distortion largely progresses in the positive direction as the height of an image increases, so that distortion undesirably shows a typical distortion—curve like the combination of the barrel-type distortion and the pin-cushion type distortion.

On the other hand, the most image-side negative lens element is arranged to correct lateral chromatic aberration. Accordingly, if the power of the most image-side negative lens element becomes too strong, coma and astigmatism largely occur.

In order to suitably correct lateral chromatic aberration, it is preferable that the Abbe number of the negative lens element having the strongest power be larger, and that of the negative lens element having the weakest power be smaller.

Furthermore, in order to reduce occurrence of lateral chromatic aberration at the peripheral portion of each negative lens element, it is preferable that condition (7) be satisfied.

Conditions (8), (9) and (10) specify the radius of curvatures of the directly facing surfaces of the negative first lens group 10 and the positive second lens group 20. Namely, these conditions relate to the radius of curvature of the most image-side surface of the negative first lens group 10, and the radius of curvature of the most object-side surface of the positive second lens group 20.

The feature of the above-explained arrangement of the lens surfaces is that the curvature of the final surface of the negative first lens group 10 and the curvature of the first surface of the positive second lens group 20 are arranged to have the center of curvature thereof on the object side.

Due to the above arrangement, the excessive overcorrection of aberrations can be prevented, and, in particular, the occurrence of higher-order spherical aberration can be reduced.

If f1/r12 exceeds the upper limit of condition (8), and if f1/r21 exceeds the upper limit of condition (9), the center of curvature is moved toward the image. Consequently, higher-order aberrations tend to occur.

If f1/r12 exceeds the lower limit of condition (8), and if f1/r21 exceeds the lower limit of condition (9), aberrations are under-corrected.

Furthermore, since the distance between the negative first lens group 10 and the positive second lens group 20 is sufficiently long, condition (10) is preferably satisfied in order to reduce the occurrence of higher-order spherical aberration and coma.

Specific numerical data of the embodiments will be described hereinafter.

In the diagrams showing spherical aberration and the sine condition, SA designates spherical aberration, and SC designates the sine condition.

In the diagrams of chromatic aberration represented by spherical aberration, the solid line and the two types of dotted lines respectively indicate spherical aberrations with respect to the d, g and C lines.

In the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

In the tables, $F_{NO}$ designates the f-number, f designates the focal length of the entire wide-angle lens system, $f_B$ designates the back focal distance (the equivalent air thickness along the optical axis from the most image-side surface of the positive second lens group 20 to the image plane), W designates the half angle-of-view (°), r designates the radius of curvature, d designates the lens-element thickness or distance between lens elements, $N_d$ designates the refractive index of the d-line, and v designates the Abbe number.

[Embodiment 1]

Figure 1:
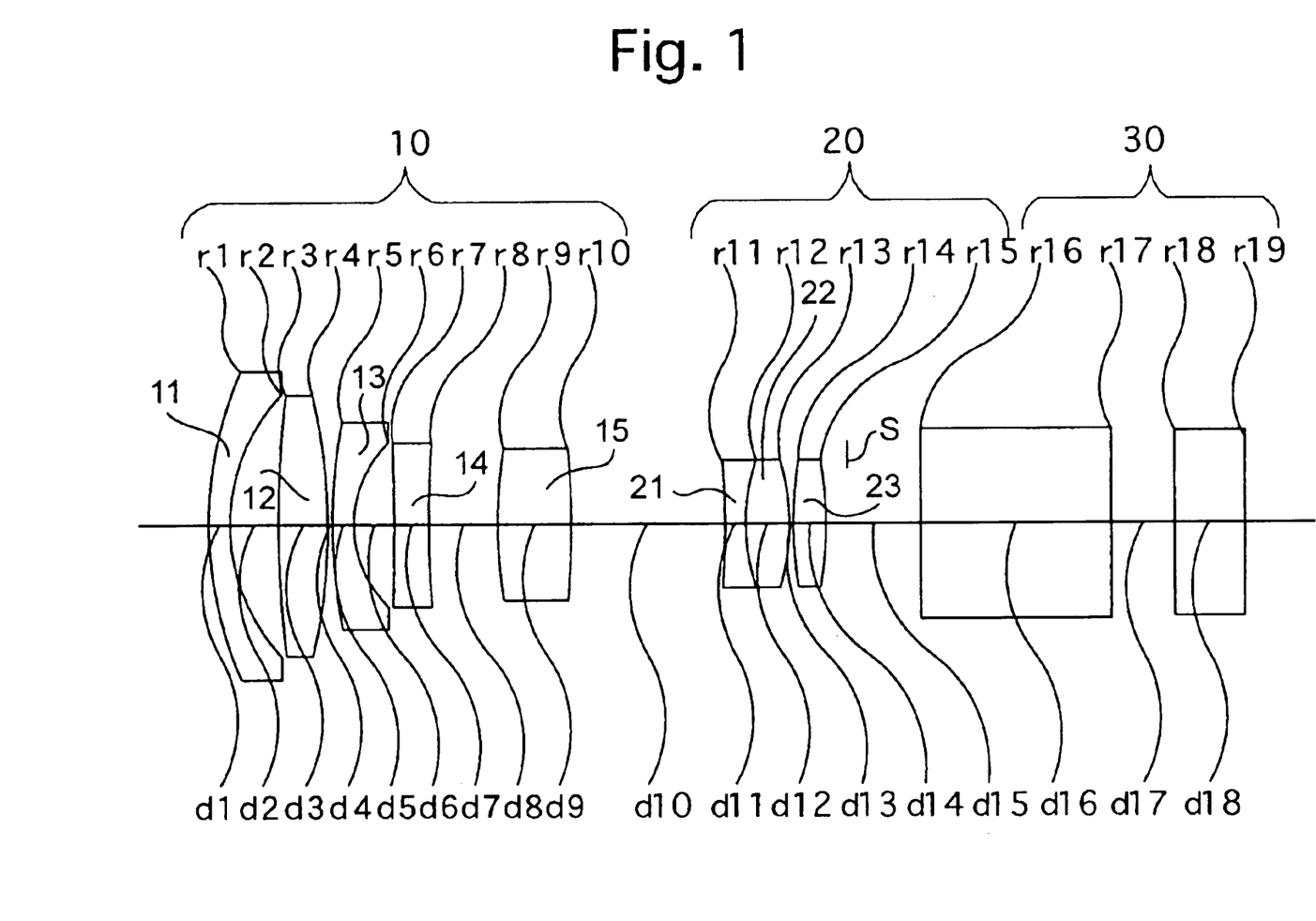
FIG. 1 is a lens arrangement of the wide-angel lens system according to a first embodiment of the present invention.
Figure 2A:
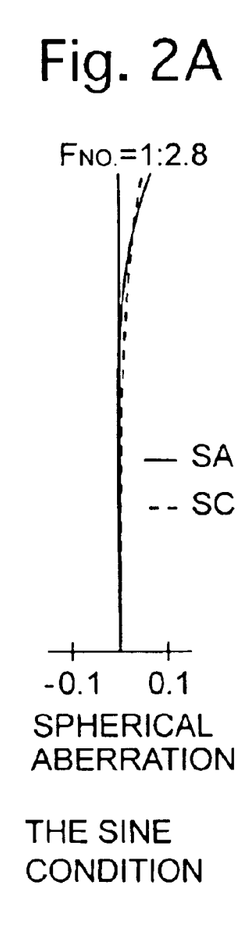
FIGS. 2A, 2B, 2C, 2D and 2E show aberrations occurred in the lens arrangement shown in FIG. 1.
Figure 2B:
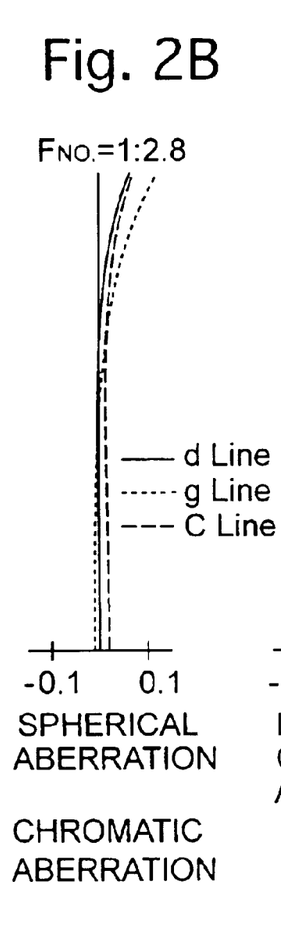
Figure 2C:
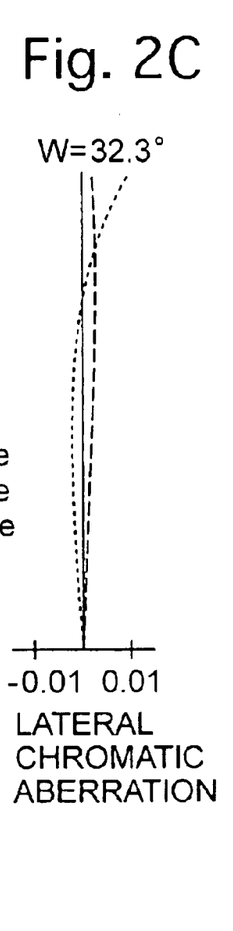
Figure 2D:
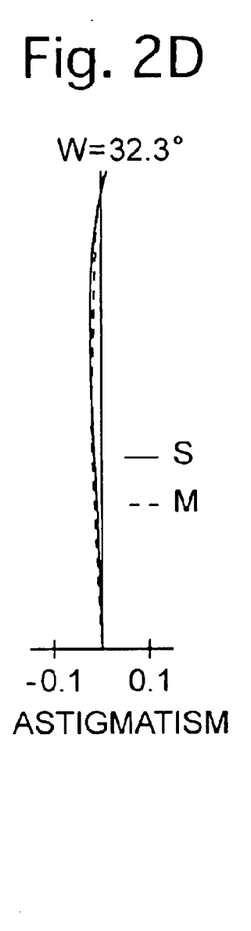
Figure 2E:
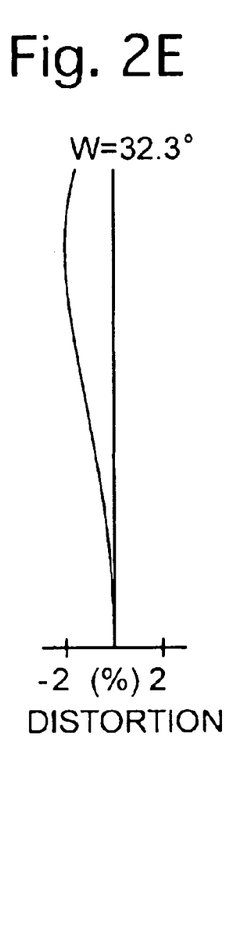

FIG. 1 is the lens arrangement of the wide-angel lens system according to the first embodiment of the present invention. FIGS. 2A through 2E show aberrations occurred in the lens arrangement shown in FIG. 1.

The negative first lens group 10 is constituted by a negative meniscus lens element 11 having the convex surface facing toward the object, a biconvex positive lens element 12, a negative meniscus lens element 13 having the convex surface facing toward the object, a biconcave negative lens element 14, and a biconvex positive lens element 15, in this order from the object.

The positive second lens group 20 is constituted by cemented lens elements having a negative lens element 21 and a positive lens element 22, and a positive lens element 23, in this order from the object.

A plane-parallel plate (filter group) 30 is provided in front of the imaging plane.

Table 1 shows the numerical data of the first embodiment; and note that the plane-parallel plate 30 is considered in the above numerical data.

The diaphragm S is provided 1.00 mm behind (on the image side) the second lens group 20 (surface No. 15). Since the diaphragm S is provided behind the positive second lens group 20, the mechanical structure of the wide-angle lens system can be simplified, and a sufficiently high optical performance can be maintained. Furthermore, in a camera having an exchangeable lens barrel, it is possible to fix the diaphragm S on the camera body side (i.e., without having a diaphragm in the lens barrel).

TABLE 1

FNO. = 1:2.8
f = 6.50
W = 32.2
fB = 15.45 (=4.35 + 9.00/1.51633 + 3.00 + 3.29/1.51633)

| Surf. No. | r | d | Nd | vd |
|---|---|---|---|---|
| 1 | 17.983 | 1.00 | 1.72342 / 38.0 | |
| 2 | 9.184 | 2.31 | | |
| 3 | 54.874 | 2.28 | 1.75520 / 27.5 | |
| 4 | −27.827 | 0.21 | | |
| 5 | 26.380 | 1.00 | 1.77250 / 49.6 | |
| 6 | 5.539 | 1.98 | | |
| 7 | −104.707 | 1.39 | 1.72825 / 28.5 | |
| 8 | 54.943 | 3.53 | | |
| 9 | 21.878 | 3.50 | 1.80518 / 25.4 | |
| 10 | −37.751 | 7.24 | | |
| 11 | −34.158 | 1.00 | 1.80518 / 25.4 | |
| 12 | 9.041 | 2.08 | 1.51742 / 52.4 | |
| 13 | −10.761 | 0.20 | | |
| 14 | 19.207 | 1.55 | 1.69680 / 55.5 | |
| 15 | −17.116 | 4.35 | | |
| 16 | ∞ | 9.00 | 1.51633 / 64.1 | |
| 17 | ∞ | 3.00 | | |
| 18 | ∞ | 3.29 | 1.51633 / 64.1 | |
| 19 | ∞ | — | | |

[Embodiment 2]

Figure 3:
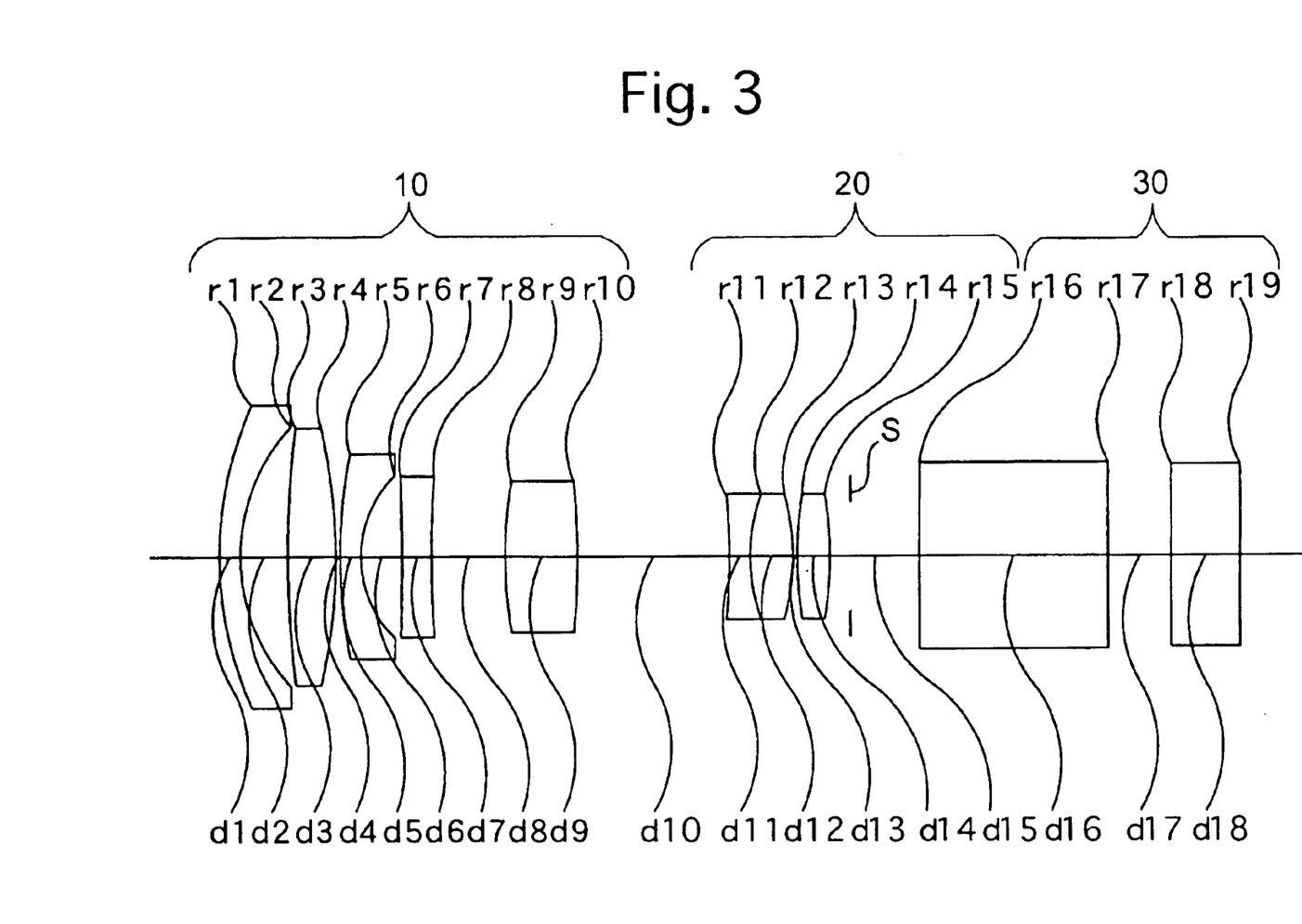
FIG. 3 is a lens arrangement of the wide-angel lens system according to a second embodiment of the present invention.
Figure 4A:
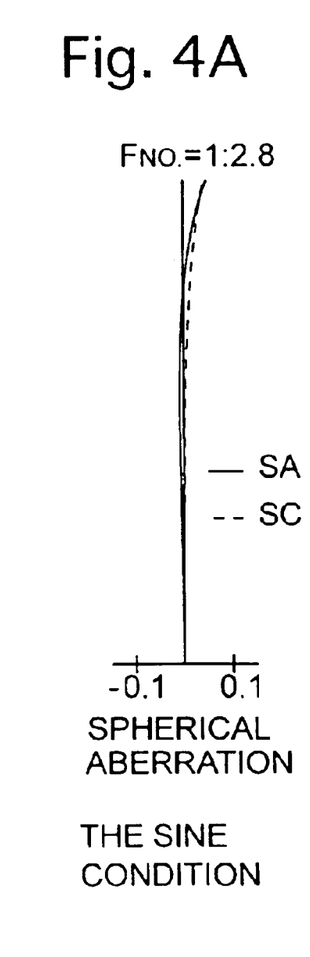
FIGS. 4A, 4B, 4C, 4D and 4E show aberrations occurred in the lens arrangement shown in FIG. 3.
Figures 4B, 4C:
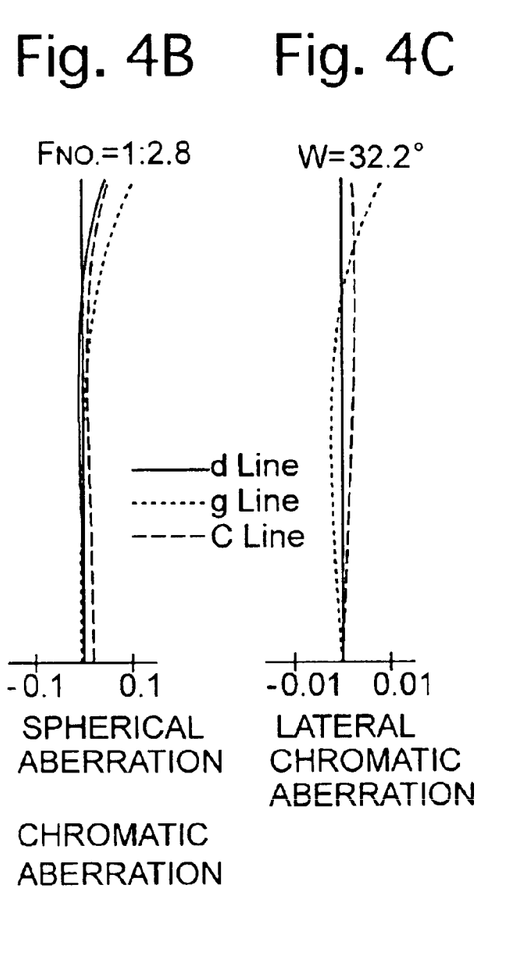
Figure 4D:
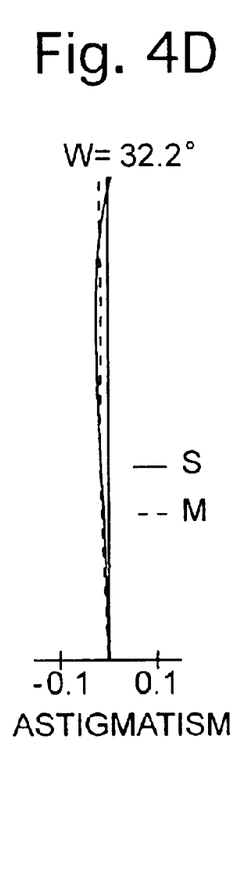
Figure 4E:
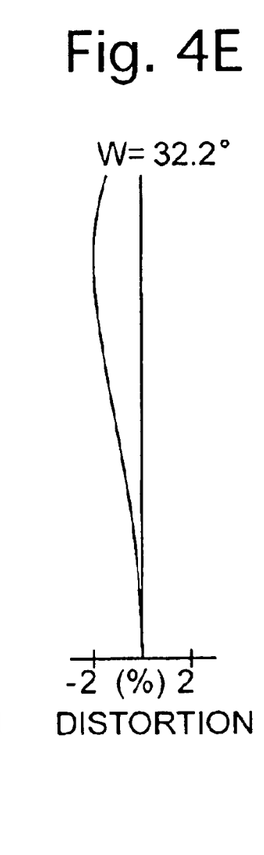

FIG. 3 is the lens arrangement of the wide-angel lens system according to the second embodiment of the present invention. FIGS. 4A through 4E show aberrations occurred in the lens arrangement shown in FIG. 3. Table 2 shows the numerical data of the second embodiment. The diaphragm S is provided 1.00 mm behind (on the image side) the second lens group 20 (surface No. 15). The basic lens arrangement of the second embodiment is the same as that of the first embodiment.

TABLE 2

FNO. = 1:2.8
f = 6.50
W = 32.3
fB = 15.42 (=4.31 + 9.00/1.51633 + 3.00 + 3.29/1.51633)

| Surf. No. | r | d | Nd | vd |
|---|---|---|---|---|
| 1 | 17.911 | 1.00 | 1.72000 / 42.0 | |
| 2 | 9.182 | 2.32 | | |
| 3 | 56.186 | 2.27 | 1.75520 / 27.5 | |
| 4 | −27.821 | 0.20 | | |
| 5 | 25.691 | 1.00 | 1.77250 / 49.6 | |
| 6 | 5.511 | 1.91 | | |
| 7 | −117.079 | 1.94 | 1.72825 / 28.5 | |

TABLE 2-continued

FNO. = 1:2.8
f = 6.50
W = 32.3
fB = 15.42 (=4.31 + 9.00/1.51633 + 3.00 + 3.29/1.51633)

| Surf. No. | r | d | Nd / vd |
|---|---|---|---|
| 8 | 59.244 | 3.15 | |
| 9 | 22.134 | 3.50 | 1.80518 / 25.4 |
| 10 | −43.955 | 7.07 | |
| 11 | −40.833 | 1.00 | 1.80518 / 25.4 |
| 12 | 9.186 | 2.08 | 1.51742 / 52.4 |
| 13 | −10.794 | 0.20 | |
| 14 | 19.777 | 1.77 | 1.69680 / 55.5 |
| 15 | −17.082 | 4.31 | |
| 16 | ∞ | 9.00 | 1.51633 / 64.1 |
| 17 | ∞ | 3.00 | |
| 18 | ∞ | 3.29 | 1.51633 / 64.1 |
| 19 | ∞ | — | |

[Embodiment 3]

Figure 5:
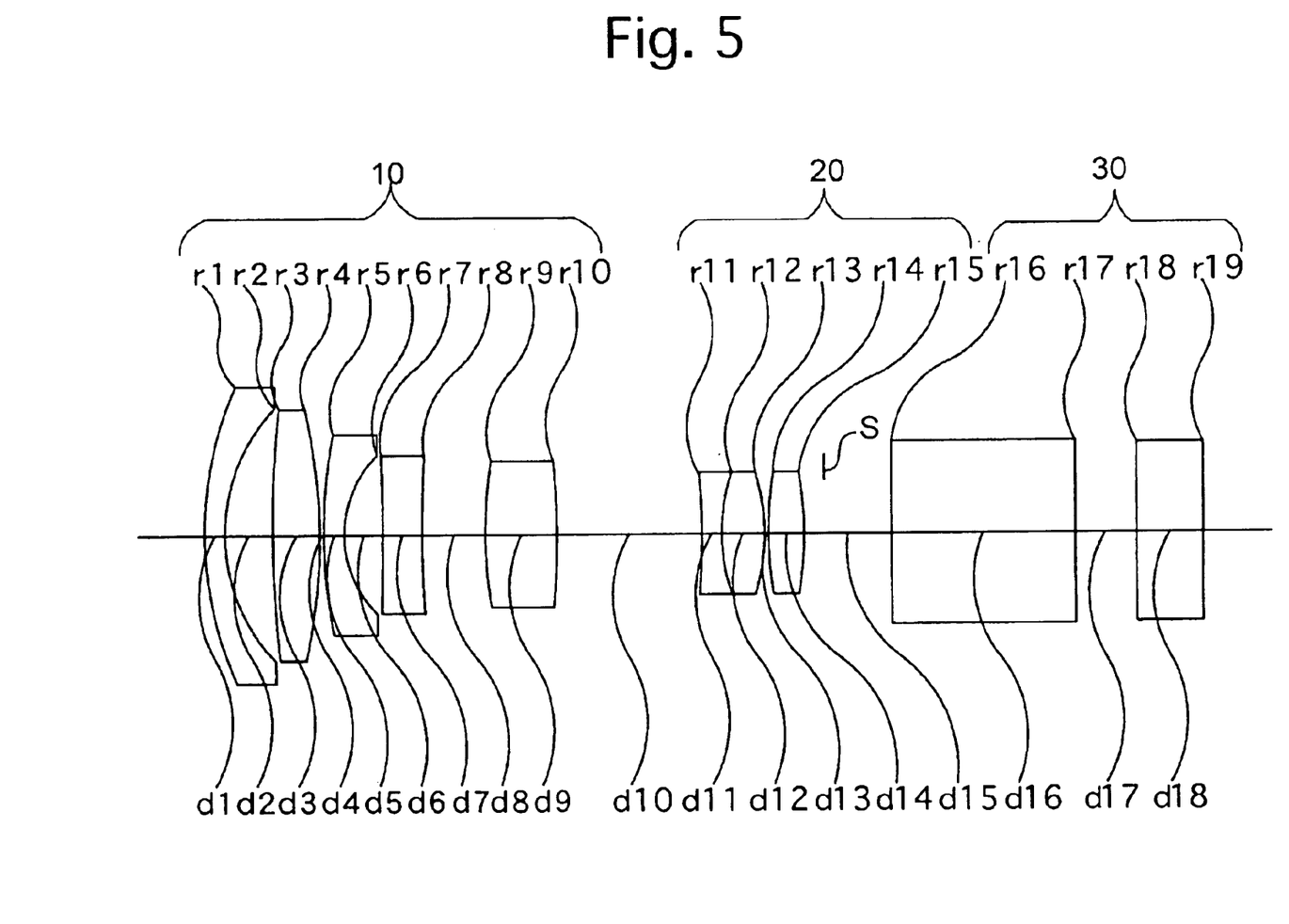
FIG. 5 is a lens arrangement of the wide-angel lens system according to a third embodiment of the present invention.
Figure 6A:
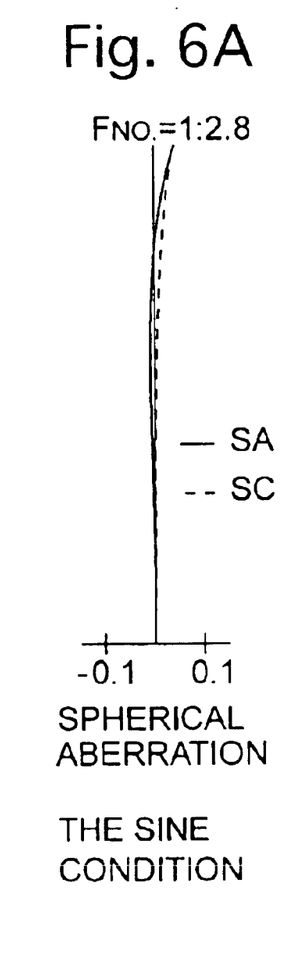
FIGS. 6A, 6B, 6C, 6D and 6E show aberrations occurred in the lens arrangement shown in FIG. 5.
Figure 6B:
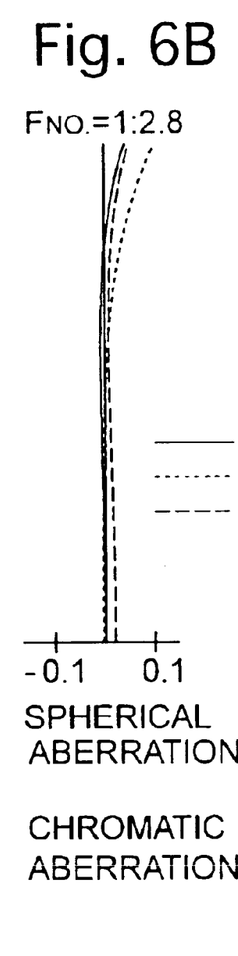
Figure 6C:
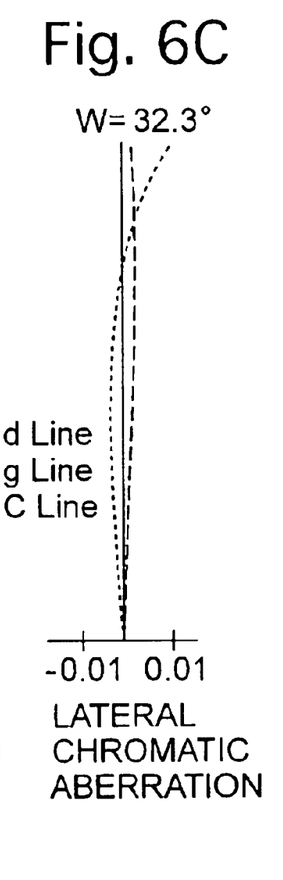
Figure 6D:
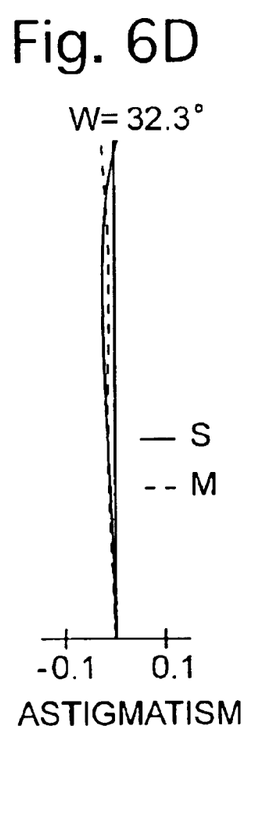
Figure 6E:
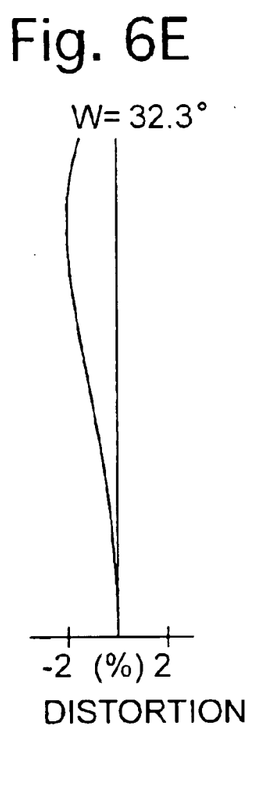

FIG. 5 is the lens arrangement of the wide-angel lens system according to the third embodiment of the present invention. FIGS. 6A through 6E show aberrations occurred in the lens arrangement shown in FIG. 5. Table 3 shows the numerical data of the third embodiment. The diaphragm S is provided 1.00 mm behind (on the image side) the second lens group 20 (surface No. 15). The basic lens arrangement of the third embodiment is the same as that of the first embodiment.

TABLE 3

FNO. = 1:2.8
f = 6.50
W = 32.3
fB = 15.58 (=4.47 + 9.00/1.51633 + 3.00 + 3.29/1.51633)

| Surf. No. | r | d | Nd / vd |
|---|---|---|---|
| 1 | 18.280 | 1.00 | 1.72000 / 42.0 |
| 2 | 9.134 | 2.31 | |
| 3 | 53.305 | 2.29 | 1.75520 / 27.5 |
| 4 | −27.857 | 0.23 | |
| 5 | 26.152 | 1.00 | 1.74320 / 49.3 |
| 6 | 5.469 | 1.92 | |
| 7 | −99.554 | 1.63 | 1.71736 / 29.5 |
| 8 | 52.749 | 3.26 | |
| 9 | 23.367 | 3.50 | 1.80518 / 25.4 |
| 10 | −39.327 | 7.22 | |
| 11 | −39.649 | 1.00 | 1.80518 / 25.4 |
| 12 | 9.237 | 2.09 | 1.51742 / 52.4 |
| 13 | −10.710 | 0.20 | |
| 14 | 19.825 | 1.55 | 1.69680 / 55.5 |
| 15 | −17.353 | 4.47 | |
| 16 | ∞ | 9.00 | 1.51633 / 64.1 |
| 17 | ∞ | 3.00 | |
| 18 | ∞ | 3.29 | 1.51633 / 64.1 |
| 19 | ∞ | — | |

[Embodiment 4]

Figure 7:
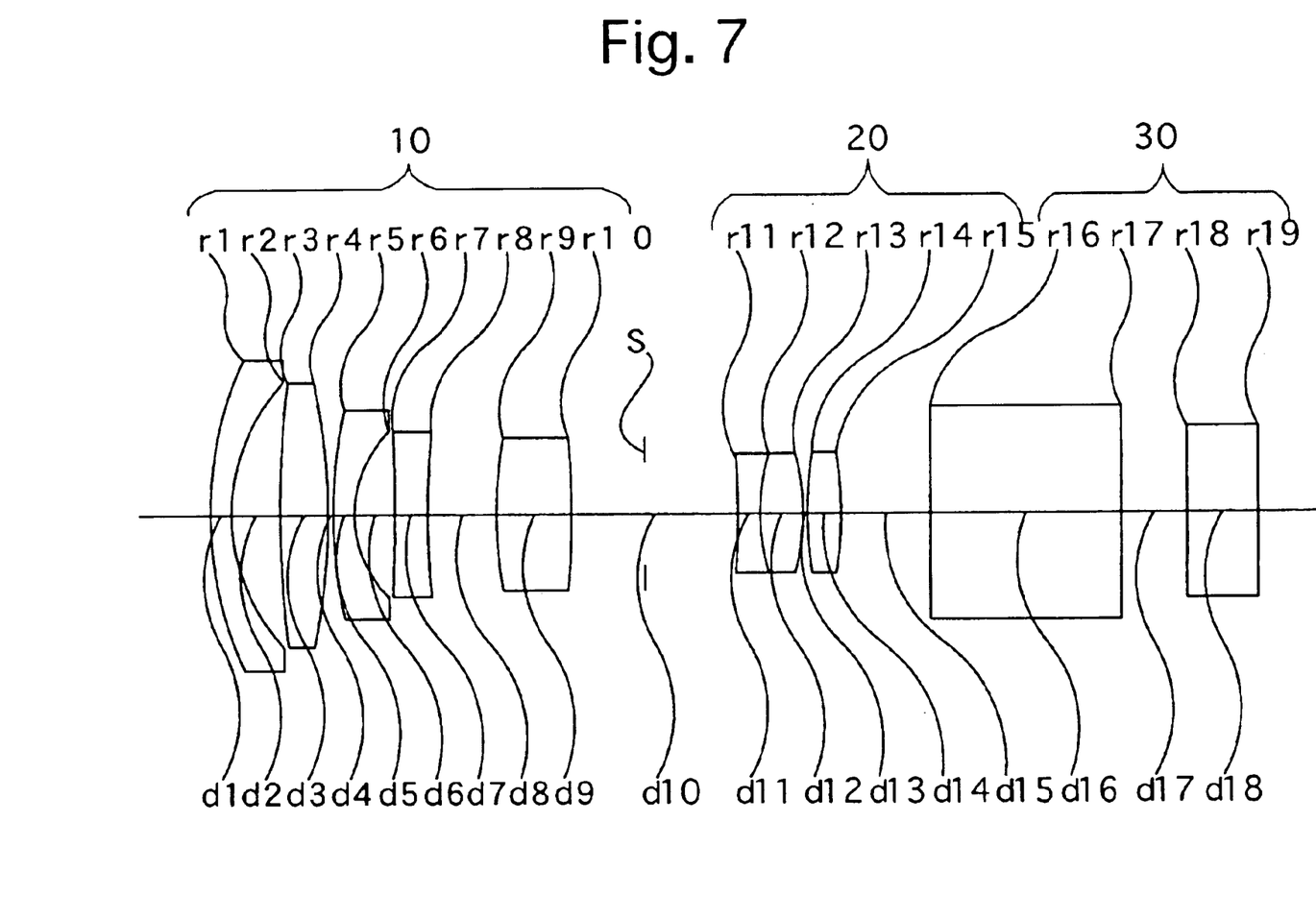
FIG. 7 is a lens arrangement of the wide-angel lens system according to a fourth embodiment of the present invention.
Figure 8A:
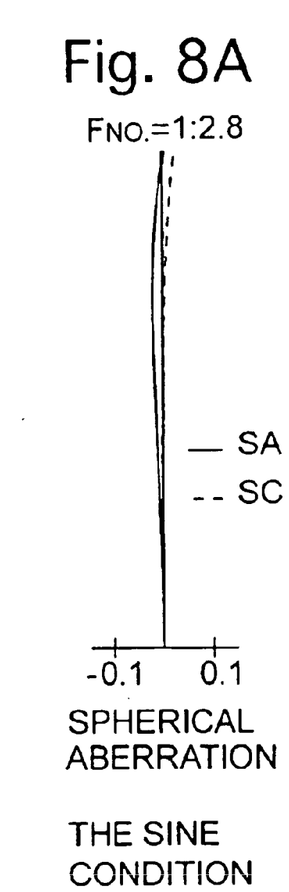
FIGS. 8A, 8B, 8C, 8D and 8E show aberrations occurred in the lens arrangement shown in FIG. 7.
Figure 8B:
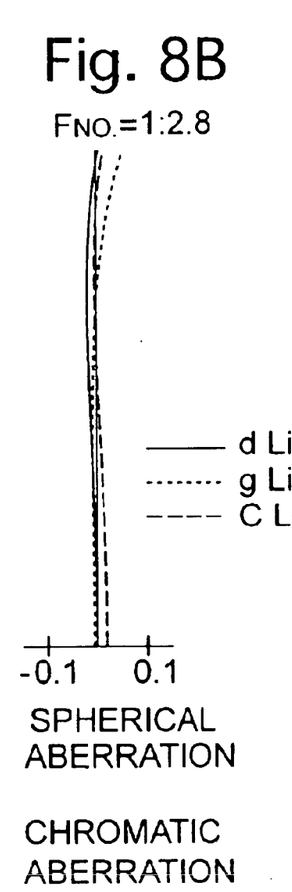
Figure 8C:
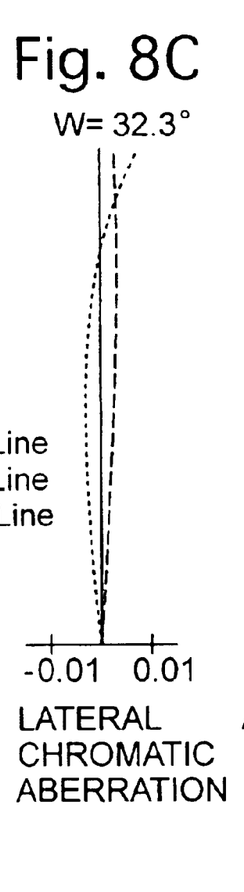
Figure 8D:
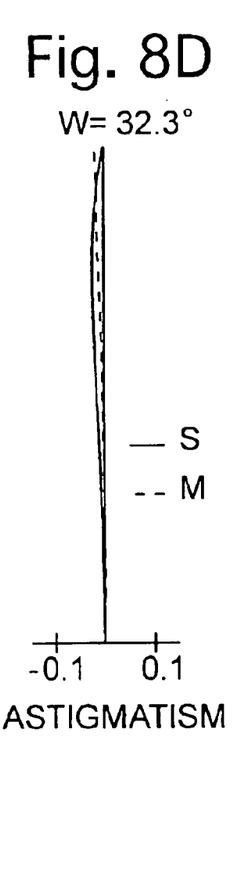
Figure 8E:
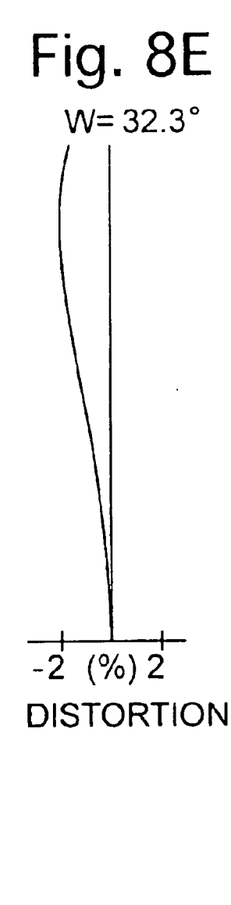

FIG. 7 is the lens arrangement of the wide-angel lens system according to the fourth embodiment of the present invention. FIGS. 8A through 8E show aberrations occurred in the lens arrangement shown in FIG. 7. Table 4 shows the numerical data of the fourth embodiment. The diaphragm S is provided 3.423 mm behind (on the image side) the first lens group 10 (surface No. 10). The basic lens arrangement of the fourth embodiment is the same as that of the first embodiment. By providing the diaphragm S between the negative first lens group 10 and the positive second lens group 20, a high optical performance can be maintained, and peripheral illumination can be easily collected.

TABLE 4

FNO. = 1:2.8
f = 6.50
W = 32.3
fB = 15.30 (=4.20 + 9.00/1.51633 + 3.00 + 3.29/1.51633)

| Surf. No. | r | d | Nd / vd |
|---|---|---|---|
| 1 | 17.677 | 1.00 | 1.72342 / 38.0 |
| 2 | 9.258 | 2.26 | |
| 3 | 50.599 | 2.26 | 1.75520 / 27.5 |
| 4 | −30.512 | 0.25 | |
| 5 | 23.349 | 1.00 | 1.77250 / 49.6 |
| 6 | 5.547 | 1.88 | |
| 7 | −110.987 | 1.54 | 1.72825 / 28.5 |
| 8 | 38.181 | 3.24 | |
| 9 | 20.654 | 3.50 | 1.80518 / 25.4 |
| 10 | −41.440 | 7.78 | |
| 11 | −36.852 | 1.00 | 1.80518 / 25.4 |
| 12 | 9.409 | 2.05 | 1.51742 / 52.4 |
| 13 | −10.706 | 0.20 | |
| 14 | 17.971 | 1.54 | 1.69680 / 55.5 |
| 15 | −18.362 | 4.20 | |
| 16 | ∞ | 9.00 | 1.51633 / 64.1 |
| 17 | ∞ | 3.00 | |
| 18 | ∞ | 3.29 | 1.51633 / 64.1 |
| 19 | ∞ | — | |

Table 5 shows the numerical values for each condition for each embodiment.

TABLE 5

| | Cond. (1) | Cond. (2) | Cond. (3) | Cond. (4) | Cond. (5) |
|---|---|---|---|---|---|
| Embod. 1 | 2.38 | 6.02 | 1.94 | 1.11 | Satisfied |
| Embod. 2 | 2.37 | 4.82 | 1.90 | 1.09 | Satisfied |
| Embod. 3 | 2.40 | 4.80 | 1.91 | 1.11 | Satisfied |
| Embod. 4 | 2.35 | 5.05 | 1.89 | 1.20 | Satisfied |

| | Cond. (6) | Cond. (7) | Cond. (8) | Cond. (9) | Cond. (10) |
|---|---|---|---|---|---|
| Embod. 1 | Satisfied | 33.3 | 1.04 | 1.15 | 0.050 |
| Embod. 2 | Satisfied | 35.3 | 0.71 | 0.77 | 0.037 |
| Embod. 3 | Satisfied | 35.8 | 0.79 | 0.79 | 0.004 |
| Embod. 4 | Satisfied | 33.3 | 0.79 | 0.89 | 0.059 |

As can be understood from Table 5, each embodiment satisfies each condition, and as can be understood from the drawings, the various aberration are adequately corrected.

According to the above description, a wide-angle lens system, having (i) an f-number of approximately 2.8, (ii) good optical performance at a half angle-of-view of 30° or more at the short focal length extremity, and (iii) a back focal distance sufficiently longer than the focal length of the entire lens system, can be obtained.

What is claimed is:

1. A wide-angle lens system comprising a negative first lens group, and a positive second lens group, in this order from an object, wherein said negative first lens group and said positive second lens group are positioned so that said distance between said negative first lens group and said positive second lens group is set as the maximum distance in said wide-angle lens system; and wherein said wide-angle lens system satisfies the following conditions:

$2.0<fB/f<2.5$ $4.5<|f_1/f|<6.2$ $1.8<f_2/f<2.0$ $1.0<d/f<1.5$ wherein fB designates the back focal distance of said wide-angle lens system;

f designates the entire focal length of said wide-angle lens system;

$f_1$ designates the focal length of said negative first lens group;

$f_2$ designates the focal length of said positive second lens group; and d designates the axial distance between said negative first lens group and said positive second lens group.

2. The wide-angle lens system according to claim 1, wherein said negative first lens group is arranged to be provided with three negative lens elements; and wherein said three lens elements satisfy the following conditions:

$|\phi_{n-3}|<|\phi_{n-1}|<|\phi_{n-2}|$ $\nu_{n-3}<\nu_{n-1}<\nu_{n-2}$ $31.0<(\nu_{n-1}+\nu_{n-3})/2<38.0$ wherein $\phi_{n-1}$, $\phi_{n-2}$, and $\phi_{n-3}$ designate optical powers of said three negative lens elements in this order from said object; and $\nu_{n-1}$, $\nu_{n-2}$, and $\nu_{n-3}$ designate the Abbe numbers of said three negative lens elements in this order from said object.

3. The wide-angle lens system according to claim 1, satisfying the following conditions:

$0.7<f1/r12<1.2$ $0.7<f1/r21<1.2$ $|(r12-r21)/(r12+r21)|<0.1$ wherein r12 designates the radius of curvature of the most image-side surface of said negative first lens group; and r21 designates the radius of curvature of the most object-side surface of said positive second lens group.

4. The wide-angle lens system according to claim 1, wherein said negative first lens group comprises a negative meniscus lens element having the convex surface facing toward the object, a biconvex positive lens element, a negative meniscus lens element having the convex surface facing toward the object, a biconcave negative lens element, and a biconvex positive lens element, in this order from said object.

5. The wide-angle lens system according to claim 1, wherein said positive second lens group comprises a cemented lens element having a negative lens element and a positive lens element, and a positive lens element, in this order from said object.

6. The wide-angle lens system according to claim 1, wherein a diaphragm is provided behind said positive second lens group.

7. The wide-angle lens system according to claim 1, wherein a diaphragm is provided between said negative first lens group and said positive second lens group.

* * * * *